(12) United States Patent
McCoy

(10) Patent No.: US 6,822,768 B1
(45) Date of Patent: Nov. 23, 2004

(54) METHOD AND APPARATUS FOR FEEDING AND SCANNING OVER-SIZED MEDIA SHEETS

(75) Inventor: Joseph Scott McCoy, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/329,614

(22) Filed: Jun. 10, 1999

Related U.S. Application Data

(63) Continuation-in-part of application No. 09/246,602, filed on Feb. 8, 1999.

(51) Int. Cl.$^7$ ................................................. H04N 1/04
(52) U.S. Cl. ....................... 358/498; 358/496; 358/497; 271/184; 271/227; 271/245
(58) Field of Search ................................ 358/498, 496, 358/497, 474; 271/184, 3.2, 227, 245

(56) References Cited

U.S. PATENT DOCUMENTS

| | | | |
|---|---|---|---|
| 4,494,166 A | | 1/1985 | Billings et al. ............. 361/214 |
| 4,736,937 A | | 4/1988 | Okuda et al. ................... 271/4 |
| 4,767,923 A | * | 8/1988 | Yuasa ......................... 250/221 |

(List continued on next page.)

FOREIGN PATENT DOCUMENTS

| | | | |
|---|---|---|---|
| JP | 2-193856 | 7/1990 | ..................... 29/34 |

*Primary Examiner*—Kimberly Williams
*Assistant Examiner*—Negussie Worku
(74) *Attorney, Agent, or Firm*—Jerry R. Potts

(57) ABSTRACT

A combination automatic document feeder and scanner operates so as to detect automatically an over-sized sheet of media. A linear image sensor detects motion of the oversized document as it is being fed into the scanner in a portrait orientation. A control algorithm responsive to the image sensor functions so those first and second portions of the over-sized sheet are successively registered over the transparent platen of the scanner and scanned. The resulting digital images of the first and second portions of the oversized sheet are digitally stitched together using a control algorithm that causes 1) a front portion of the oversized document to be advanced a sufficient distance in a forward direction to place the front portion inside the scanning area of the line scanner but not a sufficient distance to place the rear portion of the oversized document inside the scanning area of the line scanner; 2) the line scanner to move in a perpendicular direction to the oversized document to capture indicia information disposed on the front portion of the oversized document; 3) the line scanner to move to a target area below the front portion of the oversized document for capturing a line of indicia information disposed on the front portion of the oversized document; 4) the front portion of the oversized document to advance in a direction perpendicular to the motion of the line scanner in a series of predetermined exposure intervals to determine the distance the oversized document traveled into the scanning area of the line scanner; 5) the line scanner to move in a perpendicular direction to the oversized document to capture indicia information disposed on the rear portion of the oversized document; 6) the front portion indicia information to be combined with the rear portion indicia information without any substantial discontinuity between the two portions; and 7) a complete image of the over-sized sheet to be stored in a memory, faxed or printed.

7 Claims, 7 Drawing Sheets

U.S. PATENT DOCUMENTS

| | | | | |
|---|---|---|---|---|
| 4,792,859 A | * | 12/1988 | Wicker et al. | 358/473 |
| 4,994,861 A | | 2/1991 | Brandon et al. | 355/274 |
| 5,117,295 A | * | 5/1992 | Smitt | 358/474 |
| 5,128,778 A | * | 7/1992 | Blitz et al. | 358/482 |
| 5,144,448 A | * | 9/1992 | Hornbaker et al. | 348/324 |
| 5,150,273 A | | 9/1992 | Le Vantine | 361/221 |
| 5,211,386 A | * | 5/1993 | Baba | 271/3.01 |
| 5,400,208 A | | 3/1995 | Pazda et al. | 361/221 |
| 5,513,017 A | * | 4/1996 | Knodt et al. | 358/471 |
| 5,517,319 A | * | 5/1996 | Arai | 358/300 |
| 5,636,011 A | | 6/1997 | Fujiwara et al. | 399/315 |
| 5,644,411 A | * | 7/1997 | Tamagaki et al. | 358/529 |
| 5,767,990 A | * | 6/1998 | Ikeda | 358/475 |
| 5,779,234 A | | 7/1998 | Tomii et al. | 271/3.2 |
| 5,828,939 A | * | 10/1998 | Yoshiuchi et al. | 399/388 |
| 6,204,494 B1 | * | 3/2001 | Chavez | 250/208.1 |
| 6,600,568 B1 | * | 7/2003 | Lu et al. | 356/614 |

* cited by examiner

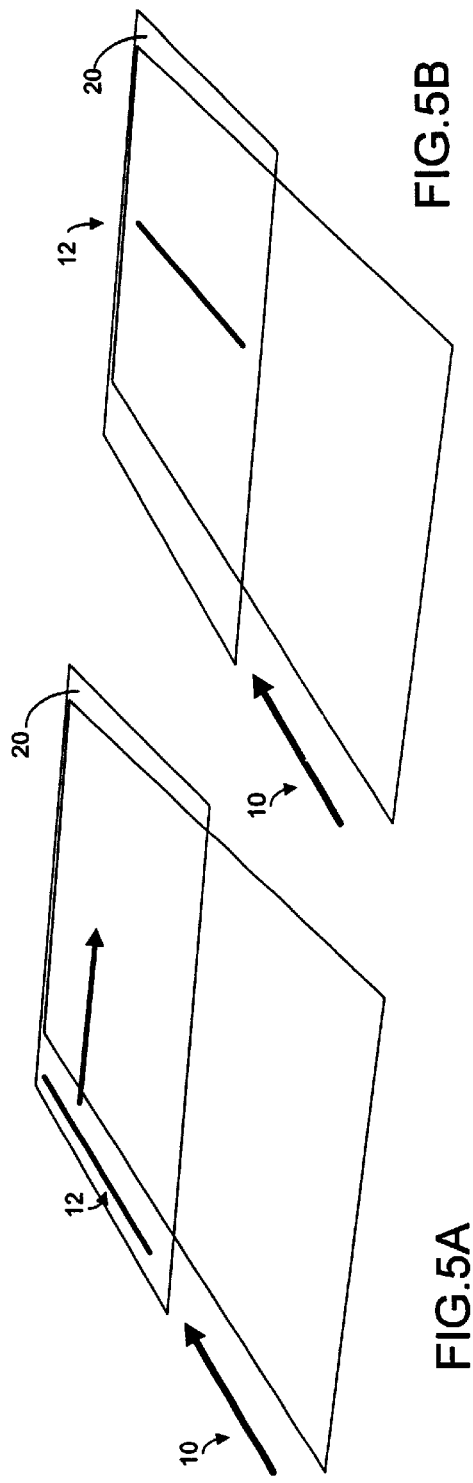
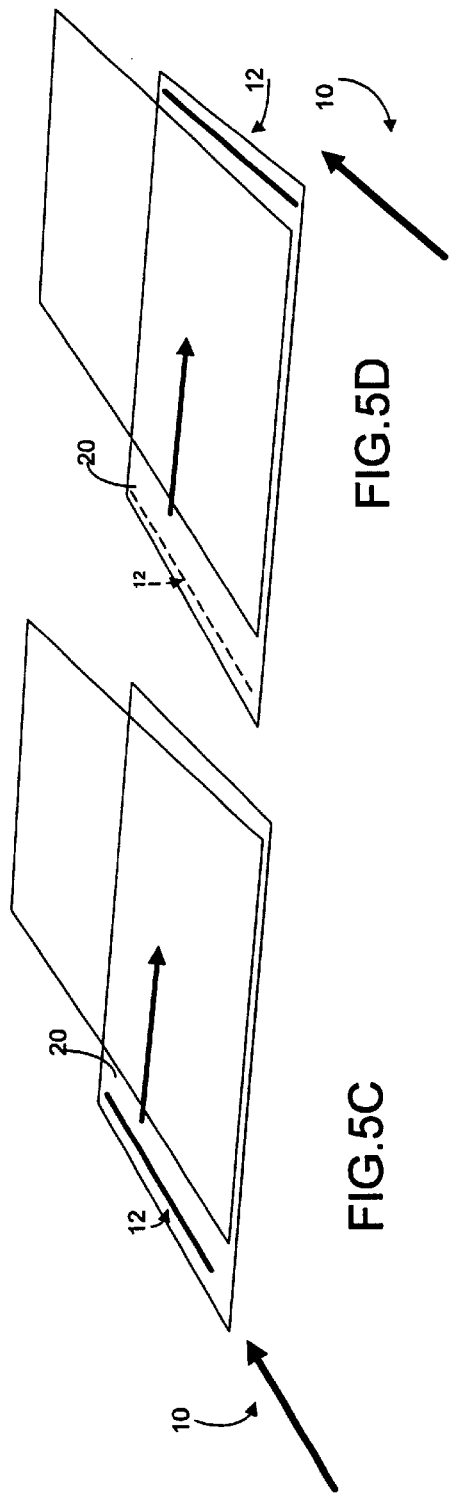
FIG.5A  FIG.5B  FIG.5C  FIG.5D

METHOD AND APPARATUS FOR FEEDING AND SCANNING OVER-SIZED MEDIA SHEETS

RELATED APPLICATIONS

This application is a continuation-in-part application of U.S. patent application Ser. No. 09/246,602 filed on Feb. 8, 1999 entitled "Automatic Document Feeder with Improved Sheet Handling Capabilities and Method of Feeding and Scanning Over-Sized Media Sheets."

BACKGROUND OF THE INVENTION

The present invention relates to printers, scanners and fax machines, and more particularly, to an automatic document feeder that is more versatile in terms of the size of sheets it can handle.

Over the past several years, combination printer, scanner and fax machines have become commercially successful. They can be attached to a personal computer and function as a traditional printer for printing high quality text and/or graphics on a suitable print medium, usually paper sheets. The printing may be reliably and economically accomplished utilizing black and/or color inkjet printer cartridges. These combination machines can also scan documents fed into the same so that text and/or graphics on the documents can be digitized and inputted into the personal computer for storage and/or further manipulation. Finally, these combination machines can scan documents fed into the same so that text and/or graphics on the documents can be sent via modem and telephone systems to other parties. In some cases these combination machines can function as low volume copiers by permitting text and/or graphics on a document fed into the machine to be scanned and then to immediately thereafter be printed on a clean sheet from an input paper tray. One example of a combination printer, scanner and fax machine with the foregoing capabilities is the Officejet (Trademark) desktop unit manufactured and sold by HEWLETT-PACKARD COMPANY, the assignee of the present application. See for example U.S. Pat. No. 5,833,381 granted Nov. 10, 1998 and assigned to HEWLETT-PACKARD COMPANY. In this type of combination machine individual sheets are fed in a unidirectional manner from an input side of the device, through the device, to an output side of the device.

Recently flat bed scanners have become popular peripheral devices for use with personal computers. Typically a document is placed flat on a large horizontal glass or transparent plastic platen and a scanning head reciprocates beneath the transparent platen to generate a very high-resolution digital image of text and/or graphics on the document for subsequent computer processing or faxing. In co-pending U.S. patent application Ser. No. 09/041,844 filed Mar. 12, 1998 of A. Justine Worley, assigned to HEWLETT-PACKARD COMPANY, and entitled MODULAR AUTOMATIC DOCUMENT FEEDER FOR A FLAT BED INPUT DEVICE there is disclosed an automatic document feeder ("ADF") for sequentially loading and unloading single sheets over a flat bed scanner. A main chassis carries the active components of the ADF including paper pick and drive mechanisms for delivering sheets to and from a flat bed scanner, motors and transmissions for driving the pick and drive mechanisms, a document backing assembly and an electronic controller. The main chassis also includes a substantially vertical document input tray. A lower chassis of the ADF includes a low-height form factor, substantially vertical, i.e. inclined, output tray, using paper stiffness caused by a predetermined bending of the outputted sheets to cause the sheets to be self-supporting. Documents are individually fed downwardly and forwardly from the input tray, in a landscape orientation, onto the transparent platen of the scanner, which scans each document moving in a direction transverse to the paper feed direction. After the completion of the scanning operation, each document is fed rearwardly and upwardly into the inclined output tray. An ink jet or laser printer can be provided beneath the flat bed scanner. The aforementioned ADF does not utilize a scroll-type sheet feed mechanism. It pushes each page instead of relying on a belt-type advance mechanism.

The aforementioned ADF is advantageously configured to be hingedly mounted to a flat bed scanner to provide a multi-function product that can scan, fax, copy and print. However, problems have arisen with regard to its sheet handling capabilities. More particularly, scanning is designed around an A/A4 scan zone in a landscape orientation only, thus preventing users from scanning and copying over-sized print media, such as legal and B-size sheets. Furthermore, if over-sized sheets are fed into the output tray in portrait fashion, one or more of the sheets can end up being pushed out of the tray onto the desktop or floor.

SUMMARY OF THE INVENTION

Accordingly, it would be desirable to provide an ADF with an improved oversized document handling capability.

According to a preferred embodiment of the present invention, a combination automatic document feeder (ADF) and scanner operates so as to detect automatically an over-sized sheet of media. A linear image sensor detects motion of the oversized document as it is being fed into the scanner in a portrait orientation. A control algorithm responsive to the image sensor functions so that a first and a second portion of the over-sized sheet are successively registered over the transparent platen of the scanner and scanned. The over-sized sheet is thereafter ejected from the scanner into an output tray. The resulting digital images of the first and second portions of the over-sized sheet are digitally rotated and stitched together by a control circuit using the control algorithm and the complete image of the oversized sheet is stored in a memory, faxed or printed.

BRIEF DESCRIPTION OF THE DRAWINGS

FIGS. 5A–D are diagrammatic representations of the ADF and flat bed scanner cooperating in carrying out the operational steps of FIG. 4.

DESCRIPTION OF THE PREFERRED EMBODIMENTS

Figure 1:
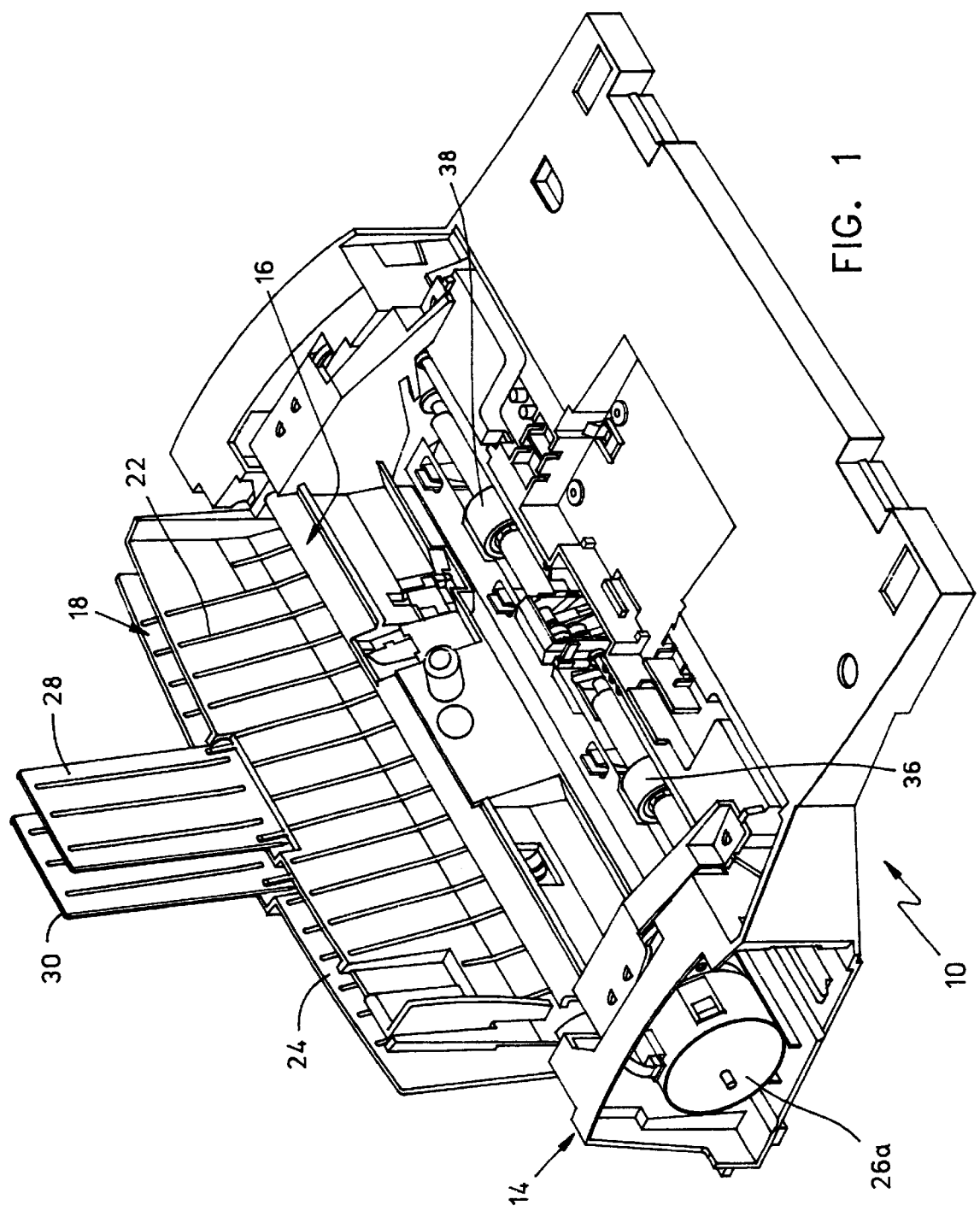
FIG. 1 is a perspective view of an automatic document feeder (ADF) utilized in accordance with the preferred embodiment of the present invention to prevent over-sized media sheets fed in portrait orientation from being accidentally driven out of the output tray of the ADF onto the desktop or floor.
Figure 2A:
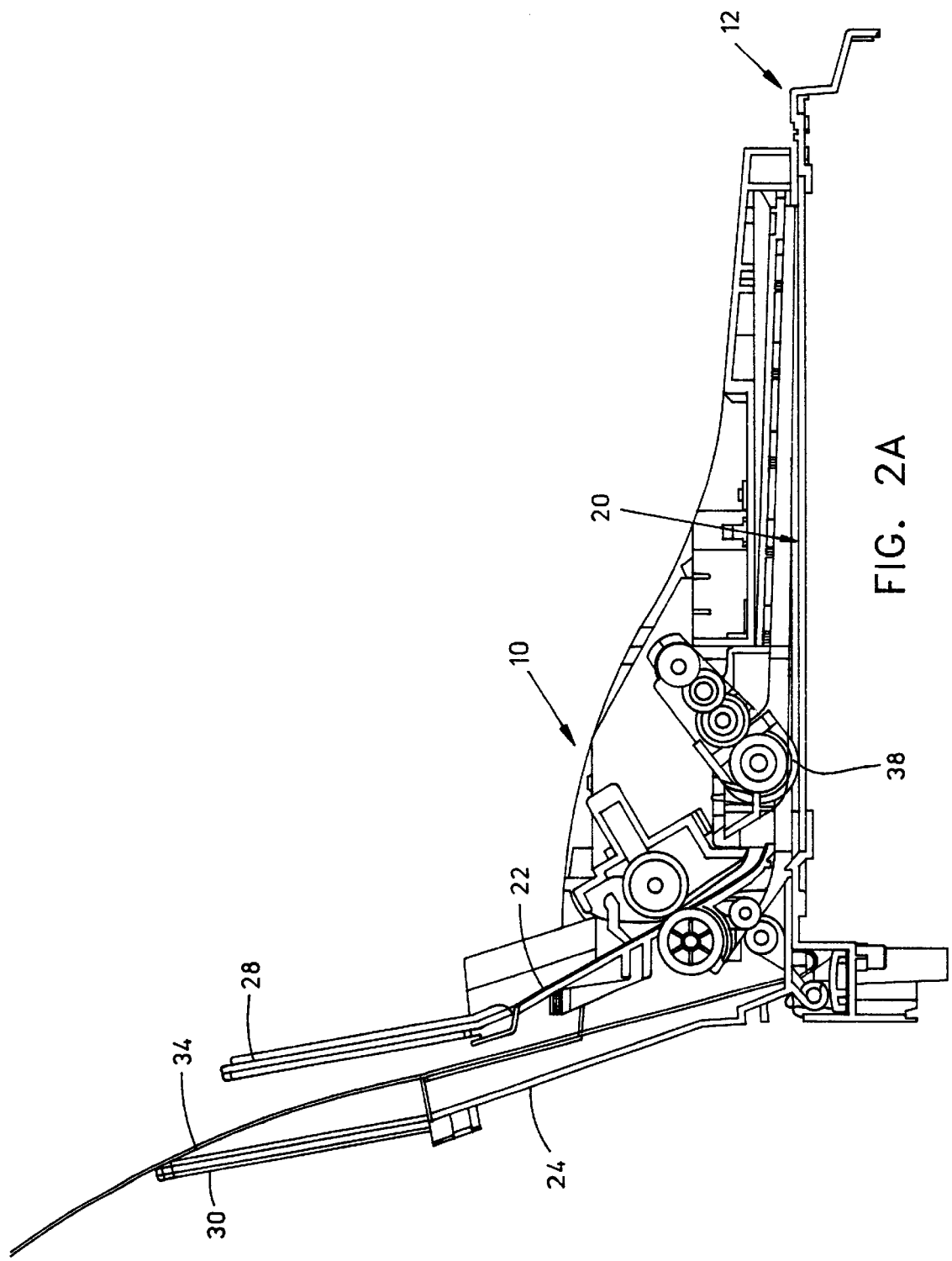
FIG. 2A is a vertical sectional view of the ADF of FIG. 1 mounted on top of the upper portion of a flat bed document scanner and showing a legal-sized sheet of media resting in the output tray of the ADF in portrait orientation.

Referring to FIG. 1, an automatic document feeder (ADF) 10 is configured and adapted to sit on top of a flat bed scanner 12 (FIG. 2A) which is electrically connected to a personal computer (not illustrated). Except as noted hereafter, the construction and operation of the ADF 10 are similar to that disclosed in the aforementioned co-pending U.S. patent application Ser. No. 09/041,844 filed Mar. 12, 1998 of A. Justine Worley entitled MODULAR AUTOMATIC DOCUMENT FEEDER FOR A FLAT BED INPUT DEVICE, the entire disclosure of which is specifically incorporated by reference. The ADF 10 (FIG. 1) includes a main chassis 14, an upper chassis 16, and a lower chassis 18. When assembled, the three chassis 14, 16 and 18 form a sheet media path that extends forwardly from an input tray 22 to an operational station at which is located a horizontally extending clear glass or transparent plastic platen 20 (FIG. 2A) of the scanner 12. The media path then extends rearwardly from the transparent platen 20 to an output tray 24. The input tray 22 and the output tray 24 are both curved and are substantially vertically oriented, with a slight rearward inclination. The input tray 22 and the output tray 24 are generally parallel with the output tray 24 being located behind the input tray 22. The three chassis 14, 16 and 18 and the trays 22 and 24 are preferably injection molded plastic parts.

The ADF 10 normally receives standard-sized media sheets, such as eight and one-half inch by eleven-inch sheets or A4-size sheets, in landscape orientation, i.e. with the longer dimension running left to right in FIG. 1, perpendicular to the feed direction. A stack of sheets is loaded into the input tray 22. The input tray 22 is concave in both vertical and horizontal planes. This double concave shape assists in both properly aligning the sheets of a multi-sheet document (not shown) and stiffening the document to facilitate sheet feeding without jamming. Sheets are individually picked off the stack in the input tray 22 and fed onto the transparent platen 20 of the flatbed scanner 12. After being scanning by a transverse motion of an optical scanning head (not illustrated) in the scanner 12, a sheet is then propelled rearwardly into the output tray 24. The sheets are normally stored in the output tray 24 until all of the sheets from the input tray 22 have been scanned and either inputted into the personal computer or sent via facsimile at which time they are manually removed from the output tray by an operator. The output tray 24 also preferably has a double concave shape. This allows a stack of sheets in the output tray 24, which extend above and beyond the tray to be self-supporting.

It will be understood that the scanner 12 is an operational station, in the broadest sense, where a function, in this case, optical scanning, is performed on a media sheet fed to the same. The ADF 10 feeds the media sheet to the operational station where a function is performed on the media sheet. It will be understood that the operational station could be a printer or some other device that acts on the media sheet. The operational function is performed on a stationary sheet in the case of a scanner and on a moving sheet in the case of a printer.

The feeding of sheets by the ADF 10 (FIG. 1) is accomplished sequentially and automatically with the aid of a pick mechanism and drive rollers described in detail in co-pending application Ser. No. 09/041,844 referenced above. A pair of stepper motors such as 26a and 26b (FIGS. 1 and 3) mounted on either side of the main chassis 14 independently drive corresponding rollers via transmissions also described in said application. The stepper motors are separately energized by a control circuit 27 (FIG. 3) in accordance with firmware and/or software implemented algorithms to move each sheet of media in the proper timed sequence from the input tray 22, over the transparent platen 20 of the scanner 12 and then back into the output tray 24. The aforementioned combination of the ADF 10 and the flat bed scanner 12 has the advantage of allowing multiple scans of an original document which eliminates the need for the entire document to be scanned into memory with a single pass of the optical scanning head.

As best seen in FIG. 1, the ADF 10 is also equipped with an input tray extender 28 and an output tray extender 30, which are connected to, and project vertically from, the uppermost edges of the input tray 22 and output tray 24, respectively. These extenders 28 and facilitate the handling of over-sized media sheets in portrait orientation, i.e. with their long dimension aligned with the longitudinal direction of the media feeding.

Figure 2B:
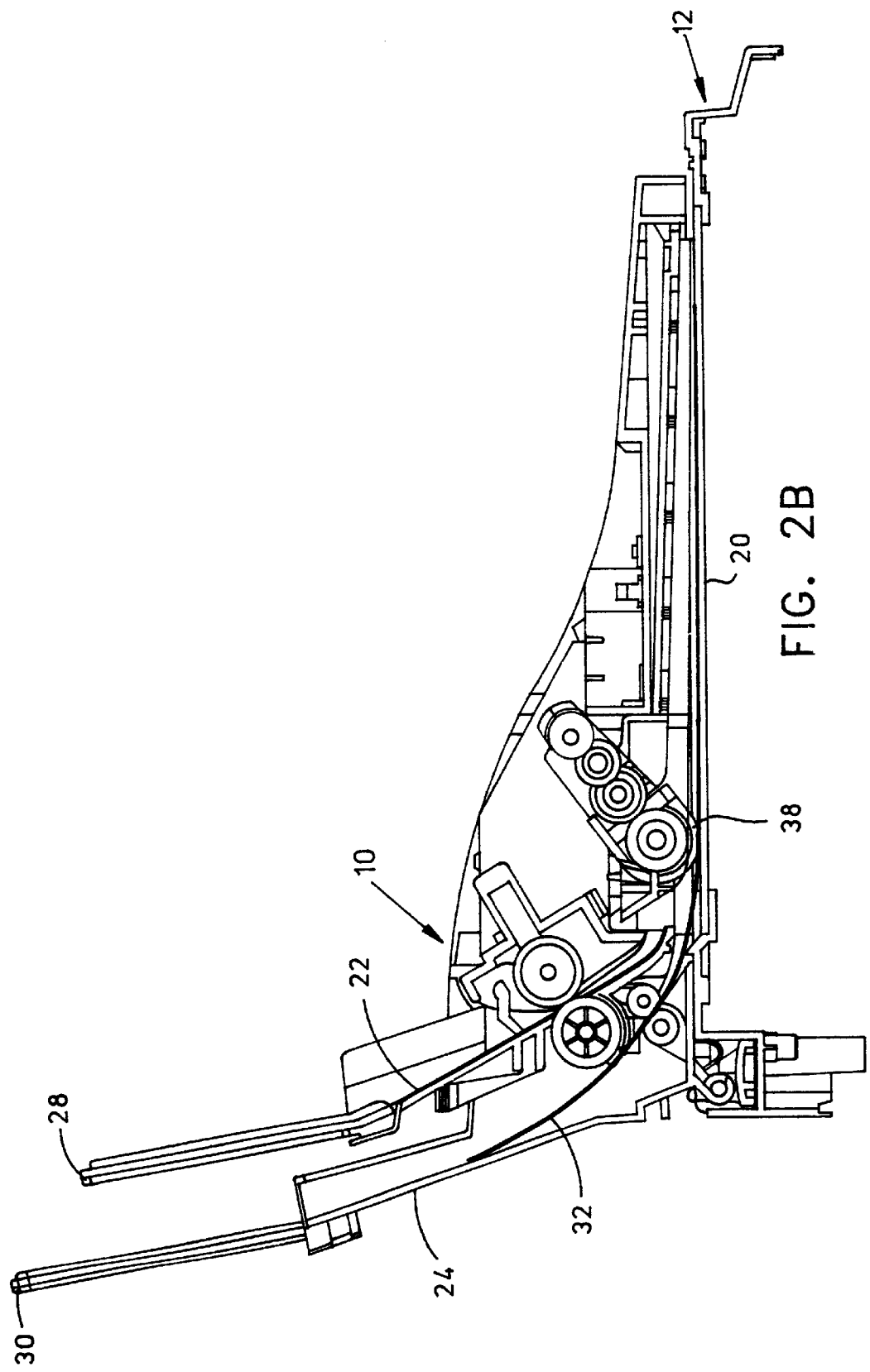
FIG. 2B is a view similar to FIG. 2A showing a legal-sized sheet of media partially ejected into the output tray of the ADF.
Figure 2C:
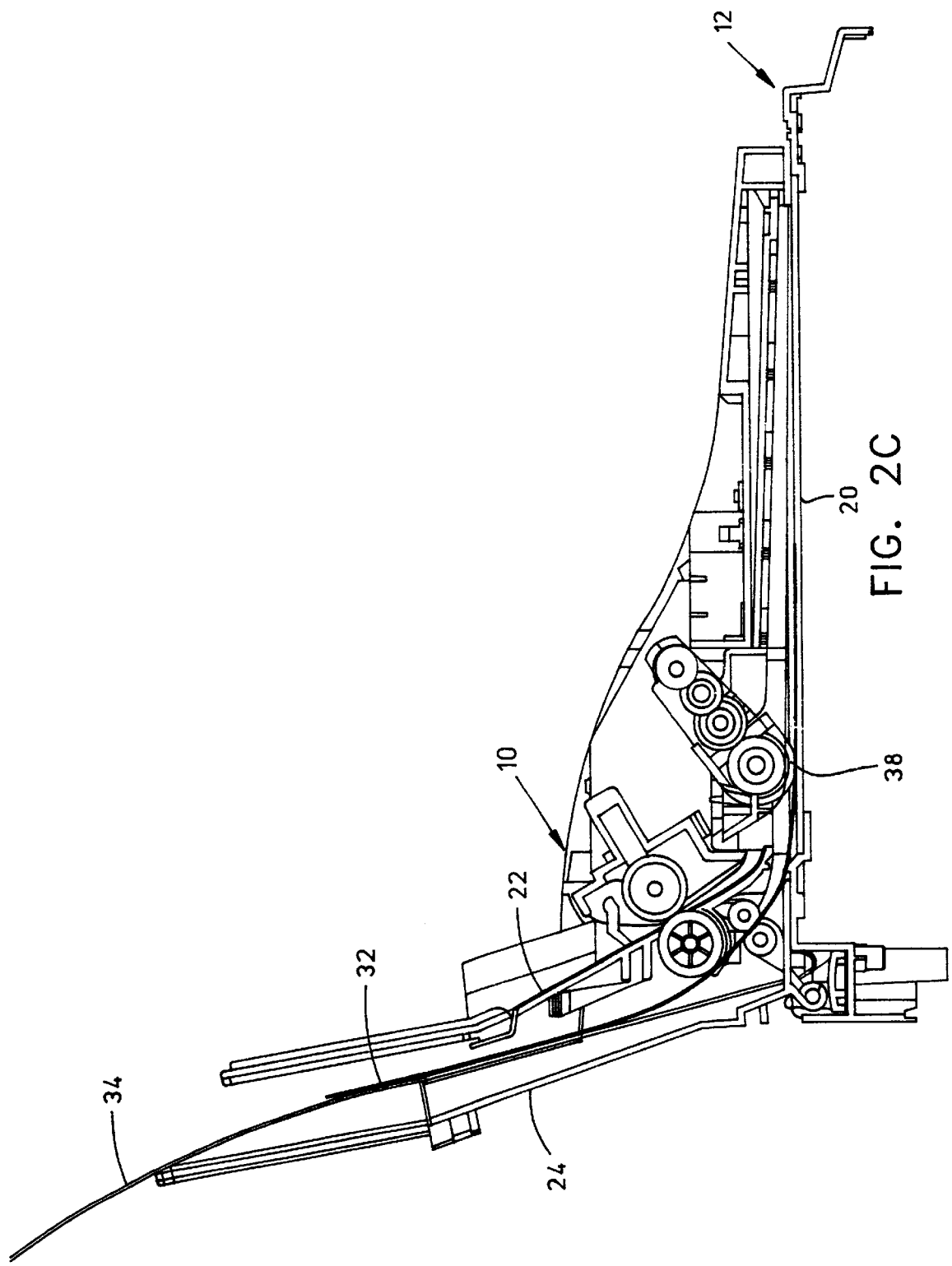
FIG. 2C is a view similar to FIGS. 2A and 2B showing a legal-sized sheet of media partially ejected into the output tray of the ADF with its leading edge pushing up against a legal-sized sheet of media already resting in the output tray.

When a sheet 32 (FIG. 2B) of media is ejected from a scanning position on top of the transparent platen 20 its leading portion, which used to be its trailing portion, has to bend in a curved fashion in order to conform to the radius of curvature of the output path. This causes its leading edge, which used to be its trailing edge, and its leading portion to press against those portions of the ADF 10 defining the output path, if this is the first sheet ejected, or against the previously ejected sheet of media. As the leading edge moves higher and higher up the output path there is more and more surface contact with the previously ejected sheet. Friction between the sheets builds up, especially if the output tray 24 already contains a stack of ejected sheets having more than an insubstantial thickness so that the output path has been significantly narrowed. In addition, in some office environments, particularly those characterized by very low humidity, a substantial charge of static electricity will build up between the sheet being ejected and the immediately previously ejected sheet of media. This appears to be at least partially a result of the media sheets rubbing against glass and plastic. When friction, enhanced by electro-static adhesion between the two overlapping sheets, exceeds the weight of a sheet, then the sheet 34 (FIG. 2C) immediately behind the sheet 32 being ejected will sometimes lift up. Since the output tray extender 30 only extends about three-quarters of the height (length) of an over-sized sheet of paper fed in portrait orientation, the sheet 34 can be pushed completely out of the output tray 24 and onto the desktop or floor. Sheets that are driven completely out of the output tray 24 can literally float away and come to rest underneath a piece of equipment on the desktop, or even onto the floor and underneath furniture. This type of unintended ejection is very undesirable since the operator may not observe this accident and will end up retrieving an incomplete multi-page document from the output tray 24 without knowing that it is incomplete. Even if the operator does observe the accident, it is tedious to retrieve the sheet that has been improperly ejected and insert it back into the multi-page document at the correct location and in the correct orientation.

In order to prevent this type of sheet media "overflow" we have discovered that the eject motion can be interrupted in a fashion that unsticks the adjacent sheets, and allows partially lifted sheets in the output tray 24 to fall back down to their proper positions. In order to achieve this, the main drive rollers 36 and 38 (FIG. 1) are driven by the stepper motors 26a and 26b so that the media sheet 32 being ejected is only partially ejected from above the transparent platen 20 and into the output path, such as seventy percent, for example. The main drive rollers 36 and 38 are then driven in a reverse direction to retract the media sheet 32 a minute amount, for example one-quarter of an inch. Thereafter the main drive rollers 36 and 38 are once again reversed to drive the media sheet 32 all of the way into the output tray 24. This technique prevents over-sized sheets that are fed through the ADF in portrait fashion from spilling out of the output tray 24 over the top end of the output tray extender 30. Clearly the speed, timing and extent of each media motion-driving segment can be varied while still producing the same beneficial result. In general, the "subsequent" media sheet 32 is preferably fed between about one-half and three-quarters of its way into the output tray 24 before its feeding direction is momentarily reversed. The subsequent media sheet 32 is preferably momentarily propelled back out of the tray in rapid fashion so that less than about one-tenth of the subsequent media sheet 32 is withdrawn from the output tray 24. This ensures that the "previous" media sheet 34, if it has been partially lifted, will fall back down to its rest position using the force of gravity and its inertia. When the previous media sheet 34 is in its rest position its lowermost edge is engaged with the lower end surface of the output tray 24.

The ADF 10 can feed standard-sized print media, e.g. standard letter or A4 sheets, in landscape fashion to the scanner 12 which is designed around an A/A4 scan zone. The scanning is done by moving the optical scan head laterally, i.e. transverse to the direction of travel of the sheets. The extenders 28 and 30 permit over-sized media sheets such as legal-size and B-size documents to be fed to the scanner 12 in portrait orientation. In such a case the media orientation is perpendicular to the scan zone and scan axis. By adding an additional sensor to the combination ADF 10 and scanner 12 and providing additional software/firmware, over-sized media sheets can be scanned in portrait orientation even though the scanner 12 normally only accommodates standard-sized media sheets fed in landscape orientation.

Figure 3:
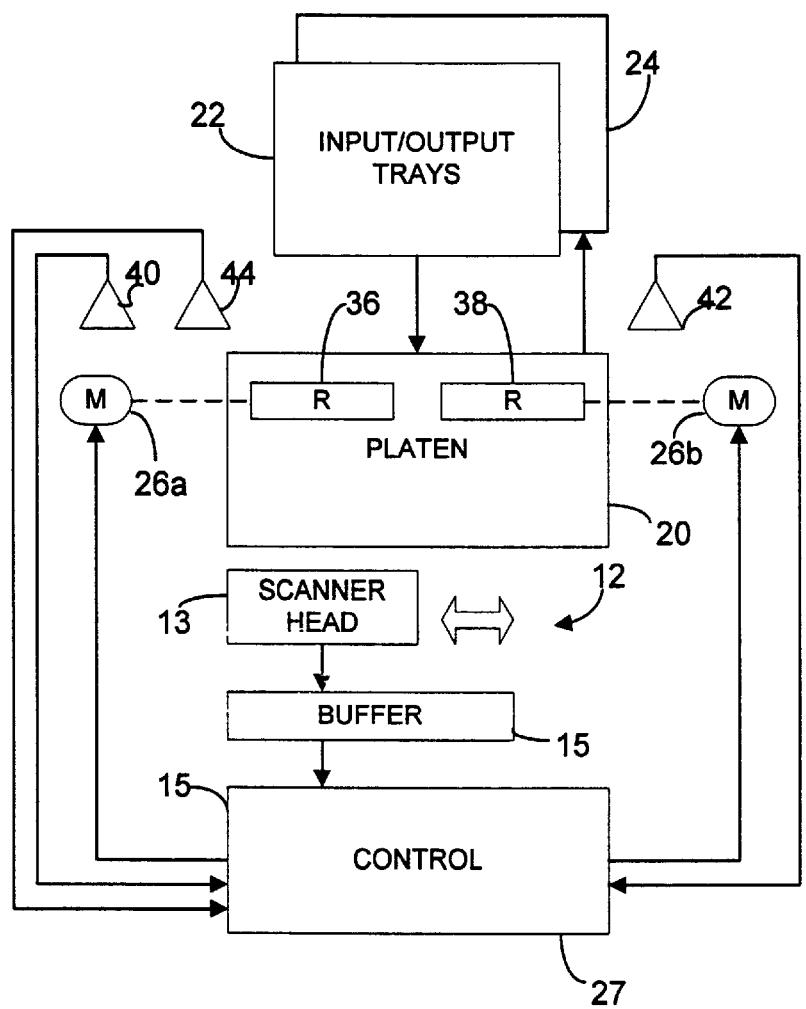
FIG. 3 is a functional block diagram of a combination ADF and document scanner utilized in accordance with another aspect of the present invention to permit over-sized media sheets to be fed and scanned in portrait orientation.
Figure 4:
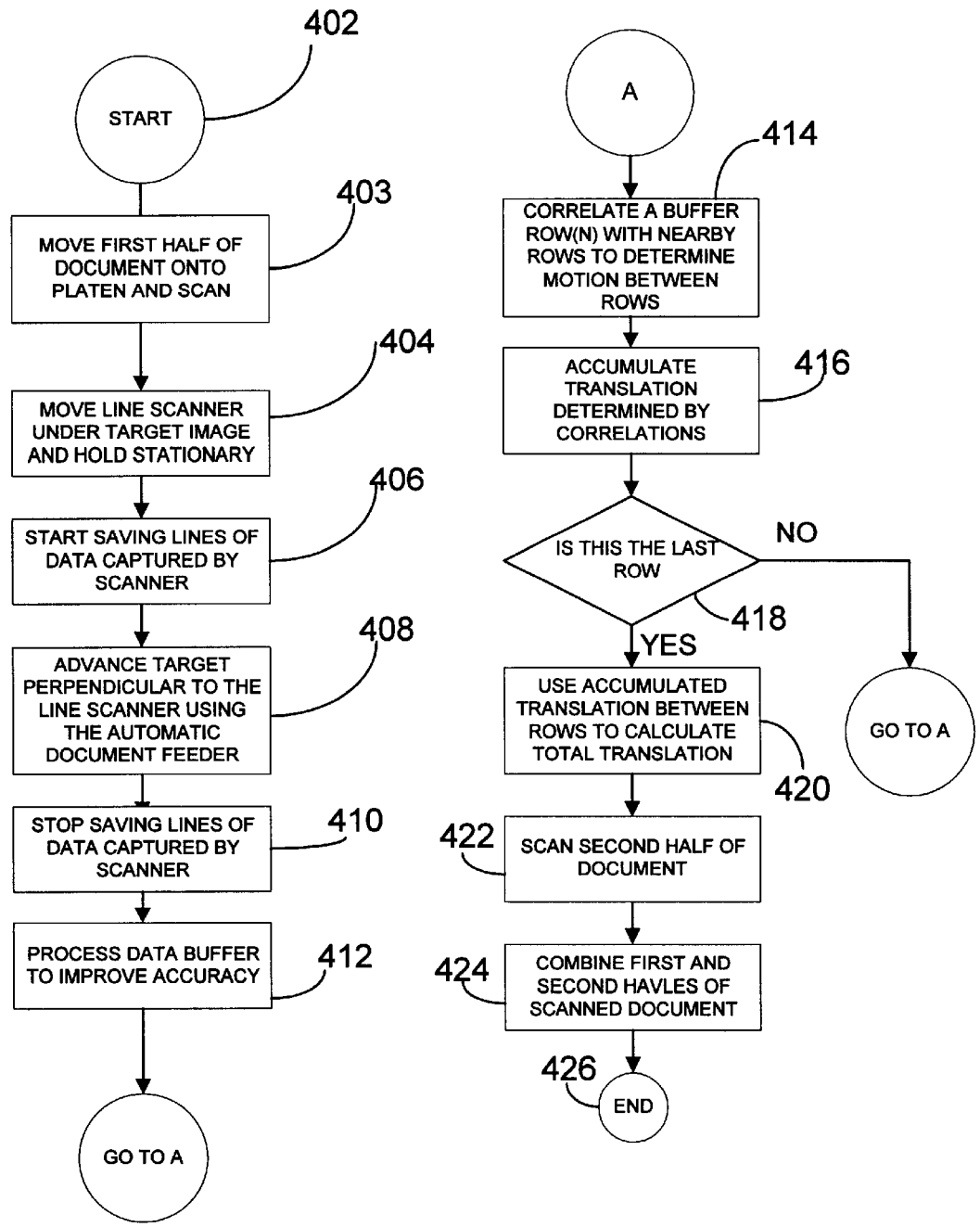
FIG. 4 is a flowchart of the operational steps performed by the automatic document feeder and scanner of FIG. 1 in determining the travel distances of a moving document to facilitate the reconstruction of scanned image information.

FIG. 3 is a functional block diagram of a combination ADF 10 and document scanner 12 that permits over-sized media sheets to be fed and scanned in portrait orientation. A pair of sensors 40 and 42 in the ADF 10 normally sense the top and bottom edges of standard-sized media sheet fed by the ADF 10 to the scanner 12 in landscape orientation. The control circuit 27, which is connected to the sensors 40 and 42, can independently operate the stepper motors 26a and 26b so that if necessary the media sheet can be de-skewed by the drive rollers 36 and 38. Where an over-sized sheet of media is picked off by the ADF 10 from the input tray 22 and fed in portrait orientation a third portrait sensor 44 is interrogated by the control circuit 27. When the control circuit 27 determines that there is no sheet outside at least one portrait margin, the firmware or software feed algorithms utilized by the control circuit 27 are switched to a portrait mode. The sheet media is then fed to the drive rollers 36 and 38 where it is de-skewed. Next, a first portion of the sheet media is fed onto the transparent platen 20 of the scanner 12 for a predetermined duration to position the sheet to a system reference edge.

The control circuit 27 next causes the optical scanner head to reciprocate in a left-to-right direction in FIG. 3, transverse to the direction of travel of the sheet media. The first portion of the sheet media is thus scanned and a digital image of its text and/or graphics is generated, rotated and stored in a memory part of the control circuit 27. The sheet media is then advanced so that a second portion thereof is located on the transparent platen 20 and scanned, and its digital image rotated and stored in the memory. In order to permit the scanning of the second portion of the media sheet, the first portion must be advanced out of the scan zone. This can be mechanically facilitated by providing a ramp in the forward portion of a scanner housing (not illustrated) similar in configuration to a rear escape ramp. During this process, the leading portion of the over-sized sheet extends through a bezel (not illustrated) in a forward side of the scanner housing. Ribs (not illustrated) can be provided in the main chassis 14 to prevent the advancing media sheet from snagging on the plastic parts. The output of one of the sensors 40, 42 or 44 is then used to detect the trailing edge of the media sheet. The control circuit 27 uses this information in order to stop the advancement of the media sheet at a predetermined time so that the second remaining portion will be registered on the transparent platen 20 to allow the text and/or graphics on the second portion to be scanned.

The two stored images are stitched together by the control circuit 27 using stored software and/or firmware algorithms. The resulting complete image is then stored in the personal computer, printed or faxed. The media sheet is then partially ejected rearwardly from the scanner 12 into the output tray 24, momentarily reversed, and then fully ejected into the output tray 24 to prevent a previously ejected sheet from being pushed up out of the tray 24 over the extender 30.

Considering now by way of example, a firmware algorithm 400 that facilitates the processing of oversized documents traveling from the ADF 10 to the scanner 12.

Before discussing a control algorithm 400 that determines travel distances of a moving document to facilitate the reconstruction of scanned image information in an oversized document in a fast and convenient manner, it may be beneficial to briefly review prior known solutions. In this regard, one prior known solution operates by scanning first and second halves of a moving document in such a manner to provide an overlapping region. The overlapping regions of the two image halves are then processed to determine the relative image translation. While this method may provide an oversized image, the method has two major disadvantages. First, the method is computationally intensive for implementation on an embedded processor. Secondly, such a method generally suffers from aliasing problem with images that have regular patterns.

Considering now the control algorithm 400 in greater detail with reference to FIGS. 4 and 5A–D, the control algorithm 400 processes image data by first correlating each row (n) of a scanned image to a row captured later in time (This row is offset in the image by the step size so as to provide row (n+step)). A correlation of the two rows (row n and row n+step) is achieved by accumulating the absolute difference between the pixels over a range of row offsets to find the best fit defined by minimum error (This step avoids the multiplication required to implement a standard correlation function). Finally, the row offsets from the correlation are accumulated and divided by the step size to determine the total distance the document moved.

It should be noted that the range of the offsets that must be checked for the best correlation is limited by assuming the document will not move backwards and that the document has a maximum acceleration. The order in which the offsets are checked is also optimized to increase the probability that the best-correlated offset will be tested early. This allows the subsequent tests to be aborted sooner when their error accumulates above the best fit.

Considering now the algorithm 400 in still greater detail with reference to FIGS. 4 and 5A–D, the control algorithm begins at a start command 402 when the ADF 10 causes an oversized document D to be transported onto the document receiving area of the scanner 12, as best seen in FIG. 5A. (In this regard, the oversized document is transported so that its leading edge or its front half portion is transported into the document pick up or scanning area 20 of the scanner 12 while its trailing edge or rear half portion is positioned outside the document scanning area 20 of the scanner 12.) With the oversized document so positioned by the ADF 10, the control algorithm 400 advances to a command step 403 that causes the optical scanner head or line scanner 13 (FIG. 3) to move below and pass below the front half portion of the document so that the indicia information on that portion of the document is scanned. This information is utilized by the algorithm 400 to determine an optimal location for collecting the positioning information as will be explained hereinafter in greater detail. Next, the algorithm 400 advances to a command step 404 that causes the line scanner 13 to be re-positioned to a stationary location below the target document rich with indicia information as best seen in FIG. 5B.

With the line scanner 13 held in a stationary position, the control algorithm advances to a command step 406 and a command step 408 to start saving lines of data captured by the scanner 12. That is the control algorithm 400 causes the line scanner 13 to capture data, row by row, as the ADF 10 moves the document in a forward direction perpendicular to the line scanner 13. That is, data is collected from the line scanner 13 at fixed intervals (exposure times) and placed in a buffer 15 that is sufficiently large in capacity to store a multiple number of rows.

From the foregoing, those skilled in the art should understand that data is collected by causing the line scanner 13 to be placed in an optimal position to capture the indicia information on the front half of the document as the document is advancing in a forward direction off of the image capture area 20 of the scanner 12. The buffer 15 is sufficiently large to store the indicia information for all rows scanned during the time the document is being advanced in a direction perpendicular to the line scanner 13. By way of example, with a 3.8 millisecond exposure time, a buffer of about 400 lines is sufficient.

The action of advancing the document from the ADF 10 also causes the rear half portion of the document to be moved into the image capture area 20 of the scanner 12 for the subsequent capture of the indicia information disposed on the rear half of the document. (FIG. 5C).

Once the paper move has been completed (by the ADF), the control algorithm 400 terminates the saving information actions by advancing to a command step 410. The data buffer now contains a series of rows such that adjacent rows only differ by the amount of target or document motion during a single exposure interval. In order to improve the accuracy of correlation between rows of captured data, the algorithm proceeds to a command step 412 that pre-processes the buffer data utilizing a unidimensional gradient filter that extends along the axis of the line scanner 13.

In order to determine the step size or motion distance between rows, the program advances to a command step 414 that causes the correlation of a buffer row (n) with another row captured at a later time. The program then advances to a command step 416 that accumulates the translation determined by the correlation. It should be understood by those skilled in the art that when multiple correlations are performed for each row they can be averaged together or the strength of the correlation can be utilized to favor the best signals.

Next, the program goes to a decision step 418 to determine whether the last buffered row captured was the last row. If the current buffered row captured is not the last buffer row of the front half portion of the document, the program returns to sep 414 and proceeds as described previously.

If a determination is made a step 418, that the current buffer row is the last buffer row, the program advances to a command step 420 that utilizes the accumulated translation between rows to calculate a total translation figure.

Once the translation vector from the first or front half of the document has been determined, the program goes to a command step 422 that causes the second or rear half portion of the document to be scanned in the same manner as previously described relative to the front half of the document. (FIG. 5D).

The program then proceeds to a command 424 that combines the first and second halves of the document using the translation vector to effect stitching without any substantial discontinuity being formed between the two halves. The program then advances to an end command 426.

While in the preferred embodiment of the present invention, the control algorithm 400 has been described as first moving the front half of the document into the scanning area 13 of the scanner, those skilled in the art will appreciate that a reverse process could just as well be employed where the front half of the oversized document is driven outside the scanning area 13 allowing the rear half of the document to be scanned first. The row data would then be gathered by using the ADF 10 to retract the rear half of the document in a series of predetermined interval steps. The translation vector would be determined in the same manner with scanning of the first or front half of the document being accomplished prior to combining the two halves.

Whereas we have described preferred embodiments of our combination ADF and scanner and improved methods of operating the same to prevent overspill and allow the scanning of over-sized media sheet in portrait orientation, it will be apparent to those of ordinary skill in the art that our invention may be modified in both arrangement and detail. For example, when ejecting a sheet of media into the output tray, it may be difficult and/or complex to momentarily reverse the direction of travel of the sheet. Beneficial results can also be achieved if the ejection motion is momentarily stopped to allow a previous sheet that is being lifted to fall back down into the output tray under the force of gravity. It will of course be understood that where the media sheet is partially ejected into the output tray and then its direction of travel is reversed, it will momentarily stop before moving in the reverse direction. Momentary reversal during ejection is thus a species of the invention that involves momentary stopping during ejection. Therefore, the protection afforded our invention should only be limited in accordance with the scope of the following claims.

I claim:

1. A method of scanning an oversized document having a front portion and a rear portion, the oversized document having an area dimension in excess of a document scanning area of a line scanner, comprising:

advancing the front portion of the oversized document a sufficient distance in a forward direction to place the front portion of the oversized document inside the scanning area of the line scanner but not a sufficient distance to place the rear portion of the oversized document inside the scanning area of the line scanner;

moving the line scanner in a perpendicular direction to the oversized document to capture indicia information disposed on the front portion of the oversized document;

positioning the line scanner in a target area below the front portion of the oversized document for capturing a line of indicia information disposed on the front portion of the oversized document;

advancing the front portion of the oversized document in a direction perpendicular to the motion of the line scanner in a series of predetermined exposure intervals to determine the distance the oversized document traveled into the scanning area of the line scanner;

moving the line scanner in a perpendicular direction to the oversized document to capture indicia information disposed on the rear portion of the oversized document; and combining the front portion indicia information with the rear portion indicia information without any substantial discontinuity between the two portions.

2. A method of stitching together scanned indicia image information from a front portion and a rear portion of an oversized document, comprising:

advancing a scanned front portion of the oversized document a sufficient distance along a scanning line of a line scanner to capture a last row in a front portion of a line of scanned image information disposed on the front portion of the oversized document; and advancing said line scanner in a scan path perpendicular to a direction traveled by the oversized document to capture a rear portion of the line disposed on the rear portion of the oversized document; and combining said last row in the front portion of the line of scanned image information disposed on the front portion of the oversized document with said line of scanned information disposed on the rear portion without causing any substantial discontinuity between said front portion of the line and said rear portion of the line.

3. A method of automatically scanning over-sized sheets of media fed from an automatic document feeder in portrait orientation utilizing a scanner adapted to scan standard-sized documents in landscape fashion by moving an optical scanning head in a direction transverse to a direction of travel of sheet media fed into the scanner by the automatic document feeder, comprising:

picking an over-sized sheet of media from an input tray and propelling the sheet in a forward direction;

advancing a first portion of the over-sized sheet into the scanner;

scanning the first portion of the over-sized sheet in a single pass of the optical scanning head;

generating a first digital image of the text and/or graphics on the first portion of the oversized media sheet;

storing the first digital image in the memory;

advancing a second remaining portion of the over-sized sheet into the scanner;

scanning the second portion of the over-sized sheet in a single pass of the optical scanning head;

generating a second digital image of the text and/or graphics on the second portion of the oversized media sheet;

storing the second digital image in the memory;

rotating and stitching the first and second digital images together to generate a third digital image representing the entire text and/or graphics on the over-sized media sheet;

storing the third image in the memory; and propelling the scanned oversized sheet of media out of the scanner and into an output tray of the automatic document feeder.

4. The method of claim 3, wherein the output of a sensor in a media path is used to detect the trailing edge of the oversized media sheet in order to register the first remaining portion of the media sheet on a transparent platen of the scanner in the appropriate position to allow the text and/or graphics on the first portion to be scanned.

5. A method of gathering indicia information from an oversized document having a front half portion and a rear half portion, where the two portions in combination exceed the scanning area of a scanner, comprising:

advancing the oversized document in a forward direction a sufficient distance into a scanning area to position the front half portion outside the scanning area of the scanner and the rear half portion in the scanning area of the scanner;

moving the oversized document in a reverse direction in a series of predetermined intervals to capture each row of indicia information on the rear half portion of the document without capturing any indicia information on the front half portion of the document;

moving the oversized document in a further reverse direction in another series of predetermined intervals to capture each row of indicia information on the front half portion of the document without capturing any indicia information on the rear half portion of the document; and combining the indicia information from the rear half of the oversized document with the indicia information from the front half of the oversized document without any substantial discontinuity between the two halves of the document.

6. A document scanning system, comprising:

an input device having a line scanner and a document receiving area;

an automatic document feeder mounted to said input device for moving an oversized document into said document receiving area, said document receiving area being sufficiently large to receive the whole of a undersized document but not sufficiently large for receiving the whole of said oversized document; and a control program for causing said automatic document feeder to move a front portion of said oversized document into said document receiving area and for causing said line scanner to travel along a rectilinear path of travel adjacent said document receiving area to facilitate the capturing of information disposed on the whole of the front portion of said oversized document;

said control program for further causing said automatic document feeder to incrementally advance the front portion of said oversized document out of said document receiving area along a path perpendicular to the path traveled by said line scanner and for causing said line scanner to be held in a stationary position during the advancing of the front portion to facilitate calculating a total translation vector between the front portion of said oversized document and a rear portion of said oversized document;

said control program still further causing said line scanner to again travel along said rectilinear path of travel to facilitate the capturing of information disposed on the whole of the rear portion of said oversized document and for using said translation vector to stitch together the captured information from the front portion and the rear portion of the oversized document without introducing any substantial discontinuity between the front portion and the rear portion.

7. In combination with an automatic document feeder and line scanner, a document control device, comprising:

a line scanner control for moving the line scanner in a rectilinear path of travel to capture in a first past indicia information disposed on a front portion of an oversized document and to capture in a second past indicia information disposed on a rear portion of said oversized document;

said line scanner control further for moving said line scanner to a determined stationary position beneath said front portion to facilitate the capturing of position information to calculate an incremental distance traveled by said front portion during a predetermined time period; and an automatic document feeder control for moving said front portion and said rear portion in unison between said first past and said second pass to position said rear portion in a location that facilitates the capturing of indicia information disposed thereon.

* * * * *

UNITED STATES PATENT AND TRADEMARK OFFICE
CERTIFICATE OF CORRECTION

PATENT NO.   : 6,822,768 B1
DATED        : November 23, 2004
INVENTOR(S)  : Joseph Scott McCoy It is certified that error appears in the above-identified patent and that said Letters Patent is hereby corrected as shown below:

Column 3,
Line 50, before "by a transverse motion,", delete "scanning", and insert therefor -- scanned --.

Column 8,
Line 15, after "to", delete "sep", and insert therefor -- step --.
Line 16, after "made", delete "a", and insert therefor -- at --.

Column 11,
Line 17, after "first", delete "path", and insert therefor -- pass --.

Column 12,
Line 2, after "second", delete "past", and insert therefor -- pass --.
Line 13, after "first", delete "past", and insert therefor -- pass --.

Signed and Sealed this

Twenty-sixth Day of April, 2005

JON W. DUDAS
*Director of the United States Patent and Trademark Office*